United States Patent
Liu et al.

(10) Patent No.: US 10,498,153 B2
(45) Date of Patent: Dec. 3, 2019

(54) DEVICE, METHOD, INFORMATION PROCESSING PROGRAM AND RECORDING MEDIUM TO PROCESS CONTROL PARAMETERS USED IN CONTROL PROCESSING OF A MOTOR CONTROL DEVICE

(71) Applicant: Beijing Xiaomi Mobile Software Co., Ltd., Haidian District, Beijing (CN)

(72) Inventors: Dongxu Liu, Beijing (CN); Xiaobo Huang, Beijing (CN); Huanyuan Feng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 175 days.

(21) Appl. No.: 15/681,122

(22) Filed: Aug. 18, 2017

(65) Prior Publication Data

US 2018/0062408 A1 Mar. 1, 2018

(30) Foreign Application Priority Data

Aug. 25, 2016 (CN) .......................... 2016 1 0729188

(51) Int. Cl.
 *H02J 7/00* (2006.01)
 *G05B 15/02* (2006.01)
(52) U.S. Cl.
 CPC ............ *H02J 7/0063* (2013.01); *G05B 15/02* (2013.01); *H02J 2007/0067* (2013.01)
(58) Field of Classification Search
 CPC .. H02J 7/0063; H02J 7/0047; H02J 2007/005; H02J 2007/0067; H02J 7/35;

(Continued)

(56) References Cited

U.S. PATENT DOCUMENTS

2010/0182774 A1\* 7/2010 Kugel ................... H02J 7/0047
 362/183
2012/0253537 A1\* 10/2012 Okuda ...................... H02J 3/32
 700/296

(Continued)

FOREIGN PATENT DOCUMENTS

CN 101778164 A 7/2010
CN 102547272 A 7/2012

(Continued)

OTHER PUBLICATIONS

First Office Action and Search Report in corresponding Chinese Application No. 201610729188.2, dated Nov. 1, 2018, 6 pages.

(Continued)

*Primary Examiner* — Rocio Del Mar Perez-Velez
*Assistant Examiner* — Alicia M. Choi
(74) *Attorney, Agent, or Firm* — Arch & Lake, LLP

(57) ABSTRACT

The disclosure relates to a method, an apparatus and a computer-readable medium for device control. The method includes obtaining remaining battery energy, an operating power and a timing period for the device and determining a power change curve of the device when the remaining battery energy is insufficient to enable the device to operate with the operating power for the timing period. The method also includes adjusting the operating power of the device according to the power change curve of the device to enable the device to operate for the timing period.

11 Claims, 8 Drawing Sheets

(58) Field of Classification Search
CPC .. H02J 7/007; H02J 3/32; G05B 15/02; G06F 1/30; G06F 1/3296; Y02D 10/172; G01R 31/3648; Y02E 60/12; H01M 10/44
USPC .......................................................... 700/296
See application file for complete search history.

(56) References Cited

U.S. PATENT DOCUMENTS

| | | | |
|---|---|---|---|
| 2012/0293122 A1* | 11/2012 | Murawaka | B60L 11/1816 320/109 |
| 2014/0047248 A1 | 2/2014 | Heo et al. | |
| 2015/0057824 A1* | 2/2015 | Gheerardyn | G05B 13/02 700/296 |
| 2016/0070327 A1 | 3/2016 | Nemani et al. | |
| 2016/0231801 A1* | 8/2016 | Chandra | G06F 1/3212 |
| 2017/0185134 A1* | 6/2017 | Han | G06F 1/3212 |
| 2018/0226801 A1* | 8/2018 | Beer | G06Q 50/06 |

FOREIGN PATENT DOCUMENTS

| | | |
|---|---|---|
| CN | 105511585 A | 4/2016 |
| EP | 3051652 A1 | 8/2016 |

OTHER PUBLICATIONS

Extended European Search Report in connection with corresponding EP Application No. 17186148, dated Dec. 19, 2017, 7 pages.

\* cited by examiner

DEVICE, METHOD, INFORMATION PROCESSING PROGRAM AND RECORDING MEDIUM TO PROCESS CONTROL PARAMETERS USED IN CONTROL PROCESSING OF A MOTOR CONTROL DEVICE

CROSS-REFERENCE TO RELATED APPLICATION

This application is based upon and claims priority to Chinese Patent Application No. 201610729188.2, filed Aug. 25, 2016, the entire contents of which are incorporated herein by reference in its entirety.

TECHNICAL FIELD

The present disclosure generally relates to the field of device control, and more particularly to a method, an apparatus and a computer-readable medium for device control.

BACKGROUND

An electronic device, such as a fan, a light or the like may meet different needs for power by adjusting its gear to different levels of use. The electronic device may further have a timing function, and operate continuously according to an operating period set by a user until the timing period expires. However, some of the electronic devices are only powered by batteries, and energy supplied by the batteries may not be sufficient to enable the device to continuously operate for the operating period set by the user.

SUMMARY

The present disclosure provides a method, apparatus and a computer-readable medium for device control.

According to a first aspect of the disclosure, a method for device control is provided. The method may include: obtaining remaining battery energy, an operating power and a timing period of the device; determining a power change curve of the device based on the remaining battery energy, the operating power and the timing period when the remaining battery energy is insufficient to enable the device to operate with the operating power for the timing period; and adjusting an operating power of the device according to the power change curve of the device to enable the device to operate for the timing period.

According to a second aspect of the disclosure, an apparatus for device control is provided. The device may include a processor; and a memory used to store processor-executable instructions to be executable by the processor; where the processor may be configured to: obtain remaining battery energy, an operating power and a timing period for the device; determine a power change curve of the device based on the remaining battery energy, the operating power and the timing period when the remaining battery energy is insufficient to enable the device to operate with the operating power for the timing period; and adjust the operating power of the device according to the power change curve of the device to enable the device to operate for the timing period.

According to a third aspect of the disclosure, a non-transitory computer-readable storage medium is provided, the computer-readable storage medium having stored therein instructions that, when executed by a processor, may cause the processor to perform: obtaining remaining battery energy, an operating power and a timing period of the device; determining a power change curve of the device based on the remaining battery energy, the operating power and the timing period when the remaining battery energy is insufficient to enable the device to operate with the operating power for the timing period; and adjusting an operating power of the device according to the power change curve of the device to enable the device to operate for the timing period.

It is to be understood that both the foregoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Figure 1:
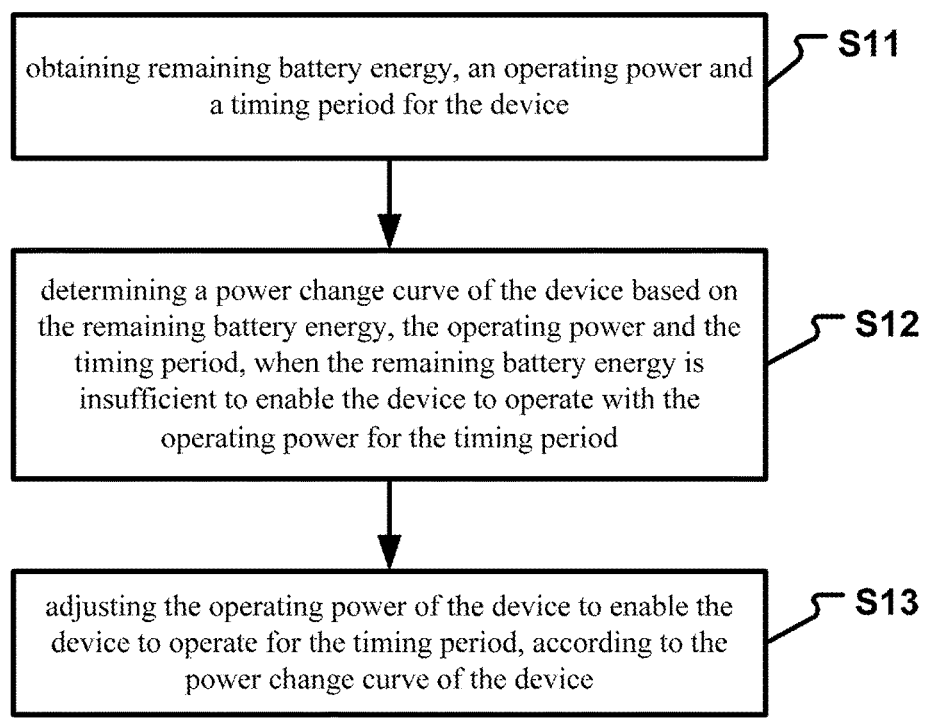
FIG. 1 is a flow chart setting forth some example steps for a method for device control according to the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the disclosure. Instead, they are merely examples of device and methods consistent with aspects related to the disclosure as recited in the appended claims.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The technical solutions provided in the embodiments of the present disclosure relate to a device which has a timing function and a capability of adjusting the operating power, and is powered by a battery. For example, the device may be a fan, a light, and the like, powered by the battery.

FIG. 1 is a flow chart for a method for device control according to an exemplary embodiment. As shown in FIG. 1, the method for device control is applicable to devices, and includes steps S11-S13 as follows.

In step S11, the method begins by obtaining remaining battery energy, an operating power and a timing period for the device.

In step S12, the method continues by determining a power change curve of the device based on the remaining battery energy, the operating power and the timing period, when the remaining battery energy is insufficient to enable the device to operate with the operating power for the timing period.

In step S13, the method includes adjusting the operating power of the device to enable the device to operate for the timing period, according to the power change curve of the device.

By obtaining the remaining battery energy, the operating power and the timing period of the device, the method may determine whether the remaining battery energy is sufficient to enable the device to operate with the operating power for the timing period; and when the remaining battery energy is insufficient to enable the device to operate with the operating power for the timing period, device is enabled to operate for the timing period by determining the power change curve of the device and adjusting the operating power of the device according to the power change curve of the device. The power change curve of the device indicates the relationship between the operating power and the operating time of the device. In some configurations of the present disclosure, the system or method may ensure that the remaining battery energy can maintain operation of the device until the timing period ends by adjusting the operating power of device.

In another aspect of the present disclosure, the method may include determining the power change curve of the device based on the remaining battery energy, the operating power and the timing period. The process may include: partitioning the timing period into a plurality of predetermined time intervals, such that at a start of each of the predetermined time intervals, the operating power of the device is reduced by a predetermined value, and a first power change curve is generated based on an operating power value within each of the predetermined time intervals; and determining the first power change curve as the power change curve of the device when the energy required for operating for the timing period, which is calculated according to the first power change curve, is equal to or less than the remaining battery energy.

In another aspect of the present disclosure, the predetermined value is determined by calculating a difference between the operating power and a minimum operating power of the device and evenly partitioning the difference by the number of the predetermined time intervals.

In another aspect of the present disclosure, the method may include determining the power change curve of the device by: adjusting the predetermined value to increase, among the predetermined time intervals, the number of predetermined time intervals during which the device is operating with the minimum operating power of the device, and generating a second power change curve based on the operating power value within each of the predetermined time intervals when the energy required for operating for the timing period, which is calculated according to the first power change curve, is greater than the remaining battery energy; and determining the second power change curve as the power change curve of the device, when the energy required for operating for the timing period, which is calculated according to the second power change curve, is equal to or less than the remaining battery energy.

In another aspect of the present disclosure, the method may include determining the power change curve of the device by: repeatedly adjusting the predetermined value to gradually increase, among the predetermined time intervals, the number of predetermined time intervals during which the device is operating with the minimum operating power of the device, and then regenerating the second power change curve based on the operating power value within each of the predetermined time intervals until energy required for operating for the timing period, which is calculated according to the regenerated second power change curve, is equal to or less than the remaining battery energy, when the energy required for operating for the timing period, which is calculated according to the second power change curve, is greater than the remaining battery energy; and determining the regenerated second power change curve as the power change curve of the device.

In another aspect of the present disclosure, the method may include adjusting the predetermined value by partitioning the difference evenly by a number of predetermined time intervals, among the predetermined time intervals, during which the device is not operating with the minimum operating power of the device to re-determine the predetermined value.

In another aspect of the present disclosure, when the remaining battery energy is insufficient to enable the device to operate with the operating power for the timing period, the method may include determining that the remaining battery energy is insufficient to enable the device to operate with the operating power for the timing period when a period of time resulted from the remaining battery energy divided by the operating power is less than the timing period.

Any of the alternative technical solutions described above may be combined as described herein or as understood by one of ordinary skill in the art.

Figure 2:
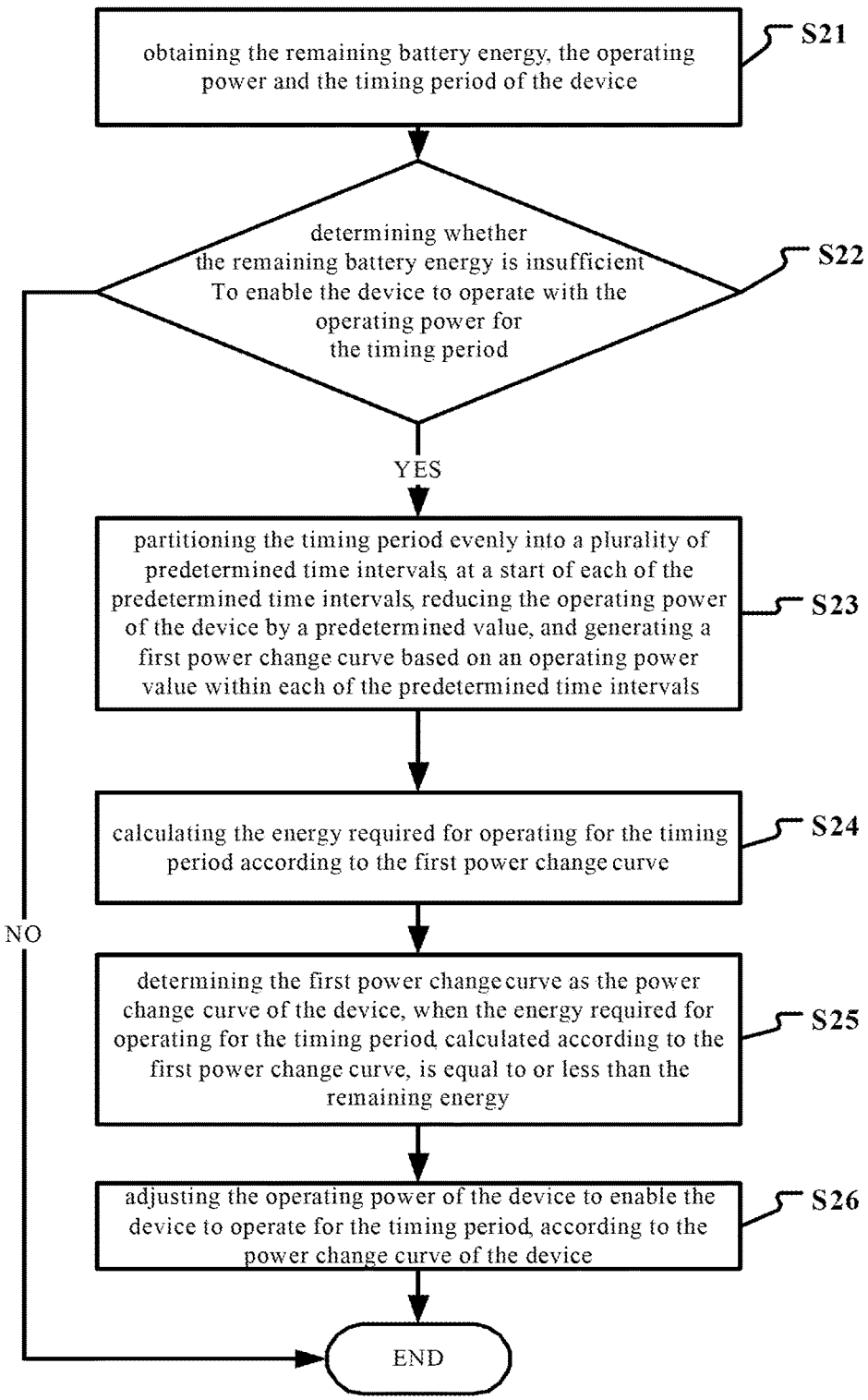
FIG. 2 is a flow chart setting forth some example steps for a method for device control according to the present disclosure.

FIG. 2 illustrates a flow chart setting forth some examples of steps forming a method for device control. As shown in FIG. 2, the method for device control may include following steps:

In step S21, the method begins by obtaining the remaining battery energy, the operating power and the timing period of the device.

The remaining battery energy may refer to an amount of available energy remained in the device's battery. The operating power may refer to the operating power specified by the user of the device, which is generally determined based on a gear level and an operating mode of the device. The timing period may refer to a period of time specified by the user, during which the device is required to operate.

In step S22, the method continues by determining whether the remaining battery energy is insufficient to enable the device to operate with the operating power for the timing period. If so, the method proceeds to step S23, and if not, the method ends.

In order to determine whether the remaining battery energy is insufficient to enable the device to operate with the operating power for a timing period, the following approach may be employed: dividing the remaining battery energy by the operating power to result a period of time, and if the period of time is less than the timing period, then determining that the remaining battery energy is insufficient to enable the device to operate with the operating power for the timing period.

For example, the user may specify that the device operate with a certain operating power P0, and launch a timing shutdown function with a duration of T0. That is to say, the device will shut down after operating for T0 and, at this point, obtain the remaining battery energy W and calculate $$T_1 = \frac{W}{P_0}.$$

If $T_1 \geq T_0$, then it is determined that the remaining battery energy is sufficient to enable the device to operate with power P0 for the timing period T0. If $T_1 < T_0$, then it is determined that the remaining battery energy is insufficient to enable the device to operate with the operating power P0 for the timing period T0.

In step S23, the method continues by partitioning the timing period evenly into a plurality of predetermined time intervals, at a start of each of the predetermined time intervals, reducing the operating power of the device by a predetermined value, and generating a first power change curve based on an operating power value within each of the predetermined time intervals.

The timing period may be partitioned into N predetermined time intervals, and each of the predetermined time intervals may be given as:

$$\Delta T = \frac{T_0}{N},$$

where $\Delta T$ is the predetermined time interval, and T0 is the timing period.

The predetermined value described above may be determined as follows: determine a difference between the operating power and a minimum operating power of the device and evenly partition the difference by the number of the predetermined time intervals to determine the predetermined value. The minimum operating power of the device may be the minimum power required for operating the device. That is, $$\Delta P = \frac{P_0 - P_L}{N},$$

where $\Delta P$ is the predetermined value, P0 is the operating power, and PL is the minimum operating power of the device.

Figure 3:
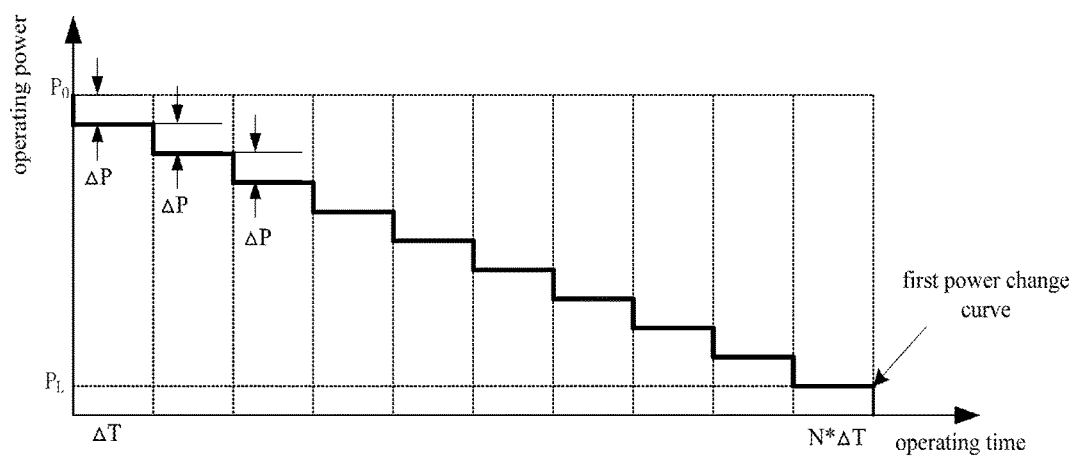
FIG. 3 is a schematic diagram that illustrates a first power change curve according to the present disclosure.

FIG. 3 is a schematic diagram that illustrates a first power change curve, which depicts the operating power of the device over time. In FIG. 3, the horizontal axis is the operating time, and the vertical axis is the operating power. The operating time is divided into predetermined time intervals $\Delta T$. In this way, determining first power change curve may include reducing the operating power of the device by $\Delta P$ when the device begins to operate with the operating power P0, i.e., at the start of the first predetermined time interval $\Delta T$. Thereafter, the operating power of the device is reduced by $\Delta P$ at the start of each of the predetermined time interval $\Delta T$, until the device is operating with PL within the last predetermined time interval. The first power change curve is generated based on the operating power value of the device within each $\Delta T$.

In step S24 illustrated in FIG. 2, the method continues by calculating the energy required for operating for the timing period according to the first power change curve.

The calculation of the energy required for operating for the timing period according to the first power change curve may be:

$$W_1 = \left(P_0 \times N - \frac{(N-1) \times N \times \Delta P}{2}\right) \times \Delta T,$$

where W1 is the energy required for operating for the timing period according to the first power change curve. Here, the energy required for operating for the timing period is calculated by summing arithmetic progression according to the first power change curve.

In step S25, the method continues by determining and setting the first power change curve as the power change curve of the device when the energy required for operating for the timing period, which is calculated according to the first power change curve, is equal to or less than the remaining energy.

When the energy required for operating for the timing period is less than the remaining battery energy, which indicates that if the operating power of the device is adjusted according to the first power change curve, the power can operate for the timing period, the device may be determined to operate according to the first power change curve.

In step S26, the method continues by adjusting the operating power of the device to enable the device to operate for the timing period, according to the power change curve of the device.

The energy for operating according to the first power change curve may also be greater than the remaining energy. In this case, the power change curve needs to be re-determined.

Figure 4:
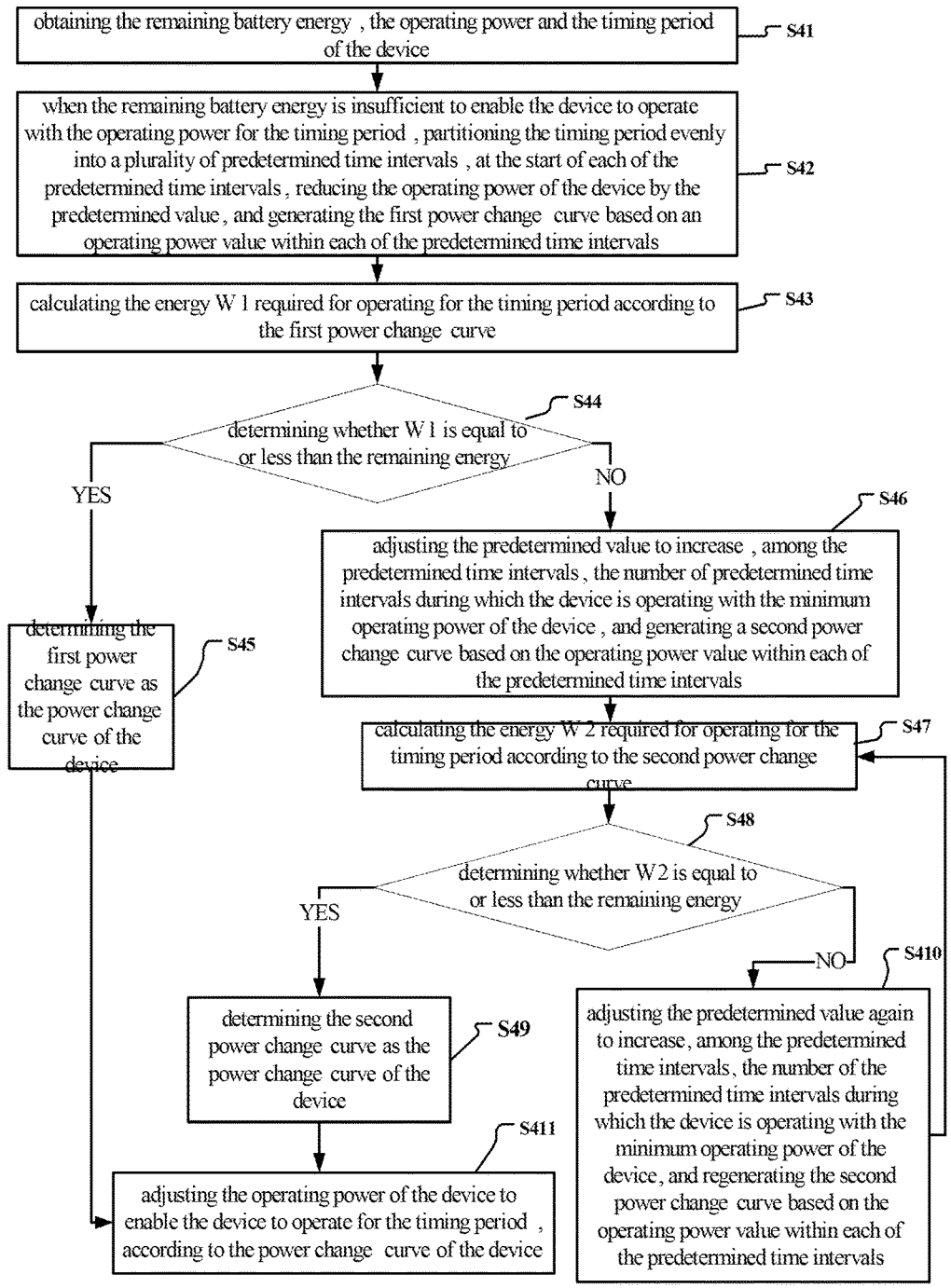
FIG. 4 is a flow chart setting forth some example steps for a method for device control according to the present disclosure.

FIG. 4 is a flow chart for a method for device control according to another exemplary implementation. As shown in FIG. 4, the method for device control may include the following steps:

In step S41, the method may include obtaining the remaining battery energy, the operating power and the timing period of the device.

In step S42, when the remaining battery energy is insufficient to enable the device to operate with the operating power for the timing period, the method includes partitioning the timing period evenly into a plurality of predetermined time intervals and, at the start of each of the predetermined time intervals, reducing the operating power of the device by the predetermined value. The method further includes generating the first power change curve based on an operating power value within each of the predetermined time intervals.

The timing period may be partitioned into N predetermined time intervals, and each of the predetermined time intervals may be given as:

$$\Delta T = \frac{T_0}{N},$$

where $\Delta T$ is the predetermined time intervals, and $T0$ is the timing period. The predetermined value is given as:

$$\Delta P = \frac{P_0 - P_L}{N},$$

where $P0$ is the operating power, and $PL$ is the minimum operating power of the device.

The generated first power change curve is as shown in FIG. 3. When the device begins to operate with the operating power $P0$, i.e., at the start of the first predetermined time interval $\Delta T$, the operating power of the device is reduced by $\Delta P$. Thereafter, the operating power of the device may be reduced $\Delta P$ at the start of each of the predetermined time intervals $\Delta T$, until the device is operating with $PL$ within the last predetermined time interval.

In step S43, the method continues by calculating the energy W1 required for operating for the timing period according to the first power change curve:

$$W_1 = \left(P_0 \times N - \frac{(N-1) \times N \times \Delta P}{2}\right) \times \Delta T.$$

In step S44, the method includes determining whether W1 is equal to or less than the remaining energy. If so, the method proceeds to step S45; if not, the method proceeds to step S46.

In step S45, the method includes determining the first power change curve as the power change curve of the device, and performing step S411.

In step S46, the method includes adjusting the predetermined value to increase, among the predetermined time intervals, the number of predetermined time intervals during which the device is operating with the minimum operating power of the device, and generating a second power change curve based on the operating power value within each of the predetermined time intervals.

When W1 is greater than the remaining energy, which indicates that the device may not operate for the timing period according to the first power change curve, thus further adjustment is needed. A new power change curve may be generated by adjusting the predetermined value $\Delta P$, by which the operating power of the device is to be reduced at the start of each of the predetermined time intervals, to increase, among the predetermined time intervals, the number of predetermined time intervals during which the device is operating with the minimum operating power of the device.

In the first power change curve as shown in FIG. 3, the operating power of the device is the minimum operating power of the device within the last predetermined time interval $N*\Delta T$. After adjustment of the predetermined value, among the predetermined time intervals, the number of predetermined time intervals during which the device is operating with the minimum operating power of the device may be increased.

Figure 5:
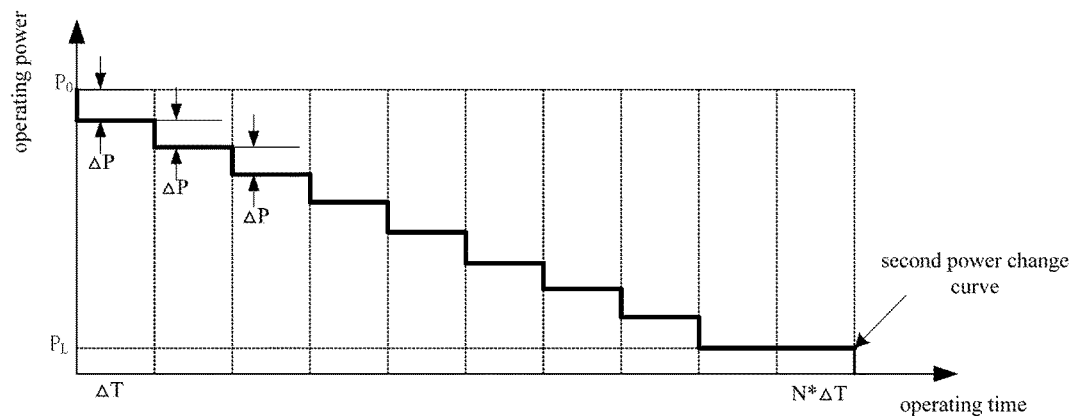
FIG. 5 is a schematic diagram that illustrates a second power change curve according to the present disclosure.

In this configuration, another predetermined time interval, during which the device is operating with the minimum operating power of the device, may be added. For example, as shown in FIG. 5, the operating power of the device within the penultimate predetermined time interval may be set as the minimum operating power of the device. In other words, by adjusting $\Delta P$, the time for operating the device with its minimum operating power increases to ensure that the device can operate for the timing period.

The predetermined value $\Delta P$ may be adjusted as described below:

At this step, the method partitions a difference between the operating power and the minimum operating power of the device by the number of predetermined time intervals during which the device is not operating with the minimum operating power of the device, among the predetermined time intervals, i.e., $$\Delta P = \frac{P_0 - P_L}{N - x},$$

where x is the number of predetermined time intervals during which the device is operating with the minimum operating power of the device among the predetermined time intervals. That is, this process determines the number of predetermined time intervals according to the current power change curve (i.e., the first power change curve) during which the device is operating with the minimum operating power of the device, and, at this point, the value of x is 1.

In step S47, the method includes calculating the energy W2 required for operating for the timing period according to the second power change curve, where:

$$W_2 = \left(P_0 \times (N-x) - \frac{(N-x-1)(N-x) \times \Delta P}{2}\right) \times \Delta T + x \times P_L \times \Delta T.$$

In step S48, the method includes determining whether W2 is equal to or less than the remaining energy. If so, the method includes proceeding to step S49; and if not, the method includes proceeding to step S410.

In step S49, the method includes determining the second power change curve as the power change curve of the device, and then proceeding to step S411.

In step S410, the method includes adjusting the predetermined value again to increase, among the predetermined time intervals, the number of the predetermined time intervals during which the device is operating with the minimum operating power of the device, and regenerating the second power change curve based on the operating power value within each of the predetermined time intervals, and then performing step S47 again.

When adjusting the predetermined value again, the difference between the operating power and the minimum operating power of the device is similarly partitioned by the number of predetermined time intervals during which the device is not operating with the minimum operating power of the device, among the predetermined time intervals. That is:

$$\Delta P = \frac{P_0 - P_L}{N - x},$$

where x is the number of predetermined time intervals during which the device is operating with the minimum operating power of the device among the predetermined time intervals, that is, the number of predetermined time intervals determined according to the second power change curve generated in step S46 during which the device is operating with the minimum operating power of the device, and at this point, the value of x is x=x+1=2.

In step S411, the method includes adjusting the operating power of the device to enable the device to operate for the timing period, according to the power change curve of the device.

For example, the timing period may be partitioned into 10 time intervals, in which case the duration of each of the time intervals is $$\Delta T = \frac{T_0}{10}.$$

Then, the predetermined value is determined as $$\Delta P = \frac{P_0 - P_L}{10},$$

by which the operating power of the device is reduced at the start of each of the time intervals. The first power change curve is generated based on the operating power value of the device within each ΔT. In the first power change curve, the operating power of the device within the last time interval is the minimum operating power of the device. The energy required for operating the device for the timing period according to the first power change curve is calculated.

When the calculated energy is greater than the remaining battery energy, the predetermined value to be reduced is adjusted as $$\Delta P = \frac{P_0 - P_L}{9}$$

for the first 9 time intervals during which the device is not operating with the minimum operating power of the device. Then, the second power change curve is generated according to the operating power value of the device within each ΔT among 10 time intervals. In the second power change curve, operating powers of the device within the last two time intervals are the minimum operating power of the device. The energy required for operating for the timing period according to the second power change curve is calculated.

When the energy required for operating for the timing period according to the second power change curve is still greater than the remaining battery energy, since both of the operating powers of the device within the last two time intervals among 10 time intervals are the minimum operating power of the device, the predetermined value to be reduced is adjusted as $$\Delta P = \frac{P_0 - P_L}{8}$$

for the first 8 time intervals during which the device is not operating with the minimum operating power of the device. Then, the second power change curve is regenerated based on the operating power value of the device within each ΔT among 10 time intervals.

In the regenerated second power change curve, operating powers of the device within the last three time intervals are the minimum operating power of the device. The energy required for operating the device for the timing period according to the regenerated second power change curve is calculated.

When the energy required for operating for the timing period according to the regenerated second power change curve is still greater than the remaining battery energy. Since the operating powers of the device within the last three time intervals among 10 time intervals are the minimum operating power of the device, the predetermined value to be reduced is adjusted again as $$\Delta P = \frac{P_0 - P_L}{7}$$

for the first 7 time intervals during which the device is not operating with the minimum operating power of the device. The second power change curve is then regenerated based on the operating power value of the device within each ΔT among 10 time intervals. As such, the recursive calculation is performed repeatedly, until the energy required for operating for the timing period, calculated according to the second power change curve, is equal to or less than the remaining battery power.

At this point, the second power change curve is determined as the power change curve of the device, and according to the power change curve of the device, the operating power of the device is adjusted to enable the device to operate for the timing period.

Sometimes, the situation exists that the remaining energy may not support the operation of the device for the timing period even though the device is operating at the minimum energy level. For example, when the N−x is reduced to 1, the energy required for operating for the timing period is still greater than the remaining battery power. Thus, the remaining battery power is not sufficient for the device to operate even though the device operates at the minimum energy level. When such situation occurs, a reminding message may be generated by the device and may be sent to the user to alert the user that the device may not operate for the timing period even though the device is operated at minimum energy level.

Sometimes, the reduction of the power assumption for the device may be done in different ways other than those illustrated above. For example, the device may be operated at either the current power level or the minimum level. For this situation, further calculation may be needed to find out how long the device operates at the current power level and how long the device operates at the minimum level. As an example, when the remaining battery energy is $W_r$, the minimum power level is $P_1$, the current power level is $P_0$ and timing period is $T_0$, the energy for operating the device at the minimum level is $P_1 \times T_0$, the maximum time to operate the device at the current power level may be: $T_c = (W_r - P_1 \times T_0)/(P_0 - P_1)$. Thus, the time to operate the device at the minimum level may be $T_0 - T_c$.

By obtaining the remaining battery energy, the operating power and the timing period of the device, the method for device control provided in present disclosure may determine whether the remaining battery energy is sufficient to enable the device to operate with the operating power for the timing period. When the remaining battery energy is insufficient to enable the device to operate for the timing period, the method determines the power change curve of the device by continuously adjusting the operating power ΔP to be reduced within the predetermined time intervals, and gradually reduces the operating power of the device according to the power change curve of the device, such that the device is enabled to operate with a gradually reduced operating power for the timing period.

Some examples of systems are provided below that may be used to perform the methods described above.

Figure 6:
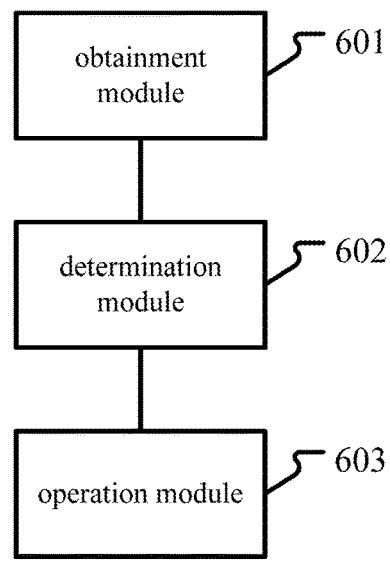
FIG. 6 is a block diagram for an apparatus for device control according to the present disclosure.

FIG. 6 is a block diagram of an apparatus for device control according to the present disclosure, which may be implemented as the part or the entire of the electronic device by software, hardware or a combination of both. As shown in FIG. 6, the apparatus includes an obtainment module 601, configured to obtain the remaining battery energy, the operating power and the timing period of the device. The apparatus also includes a determination module 602, configured to determine the power change curve of the device based on the remaining battery energy, the operating power and the timing period. The apparatus also includes an operating module 603, configured to adjust the operating power of the device according to the power change curve of the device to enable the device to operate for the timing period.

By obtaining the remaining battery energy, the operating power and the timing period of the device, the apparatus for device control of the present disclosure may determine whether the remaining battery energy is sufficient to enable the device to operate with the operating power for the timing period. When the remaining battery energy is insufficient to enable the device to operate for the timing period, the apparatus enables the device to operate for the timing period by determining the power change curve of the device and adjusting the operating power of the device according to the power change curve of the device. The apparatus, thus, can be used to ensure that the remaining battery energy can maintain operation of the device until the timing period ends by adjusting the operating power of the device.

Figure 7:
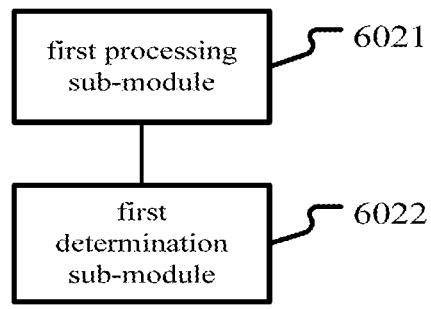
FIG. 7 is a block diagram for sub-modules of an apparatus for device control according to the present disclosure.

In another aspect of the present disclosure, as shown in FIG. 7, the determination module 602 may include a first processing sub-module 6021 and a first determination sub-module 6022, wherein the first processing sub-module 6021 is configured to partition the timing period evenly into a plurality of predetermined time intervals, reduce the operating power of the device by a predetermined value at a start of each of the predetermined time intervals, and generate the first power change curve based on the operating power value within each of the predetermined time intervals. The determination module 602 also includes first determination sub-module 6022 configured to determine the first power change curve as the power change curve of the device, when the energy required for operating for the timing period, which is calculated according to the first power change curve, is equal to or less than the remaining battery energy.

In another aspect of the present disclosure, the first processing sub-module 6021 is configured to determine the predetermined value by determining a difference between the operating power and a minimum operating power of the device and evenly partition the difference by a number of the predetermined time intervals.

Figure 8:
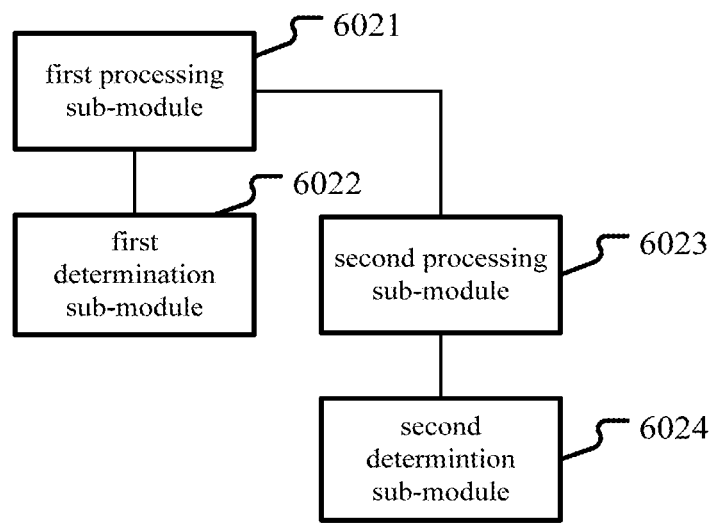
FIG. 8 is a block diagram for another example of apparatus for device control according to the present disclosure.

In another aspect of the present disclosure, as shown in FIG. 8, the determination module 602 may further include a second processing sub-module 6023, configured to adjust the predetermined value to increase, among the predetermined time intervals, the number of predetermined time intervals during which the device is operating with the minimum operating power of the device. the second processing sub-module 6023 may generate a second power change curve based on the operating power value within each of the predetermined time intervals, when the energy required for operating for the timing period, which is calculated according to the first power change curve, is greater than the remaining battery energy. A second determination sub-module 6024 is configured to determine the second power change curve as the power change curve of the device, when the energy required for operating for the timing period, which is calculated according to the second power change curve, is equal to or less than the remaining battery energy.

Figure 9:
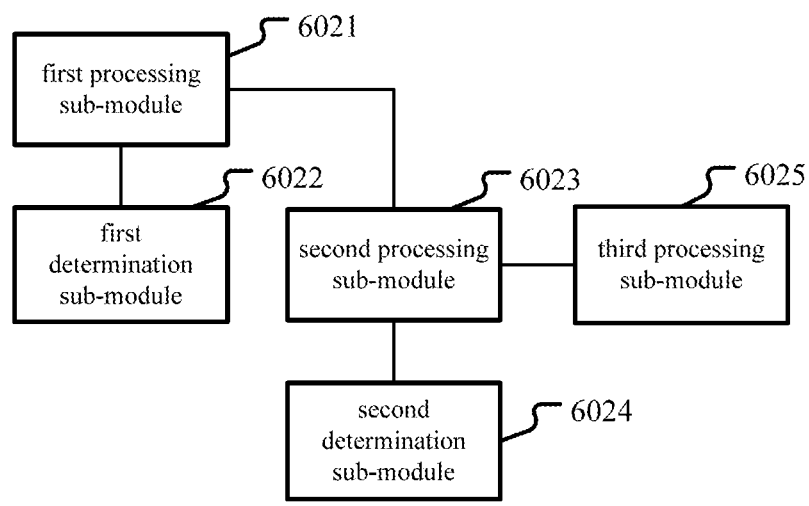
FIG. 9 is a block diagram for an additional example of apparatus for device control according to the present disclosure.

In another aspect of the present disclosure, as shown in FIG. 9, the determination module 602 may further include a third processing sub-module 6025, configured to repeatedly adjust the predetermined value to gradually increase, among the predetermined time intervals, the number of predetermined time intervals during which the device is operating with the minimum operating power of the device. The third processing sub-module 6025 can regenerate the second power change curve based on the operating power value within each of the predetermined time intervals until the energy required for operating for the timing period, which is calculated according to the regenerated second power change curve, is equal to or less than the remaining battery energy. The repeat adjustment may be done when the energy required for operating for the timing period, which is calculated according to the second power change curve, is greater than the remaining battery energy. The third processing sub-module 6025 may also be configured to determine the regenerated second power change curve as the power change curve of the device.

In another aspect of the present disclosure, the second processing sub-module 6023 is configured to partition the difference evenly by the number of predetermined time intervals, among the predetermined time intervals, during which the device is not operating with the minimum operating power of the device to re-determine the predetermined value.

Figure 10:
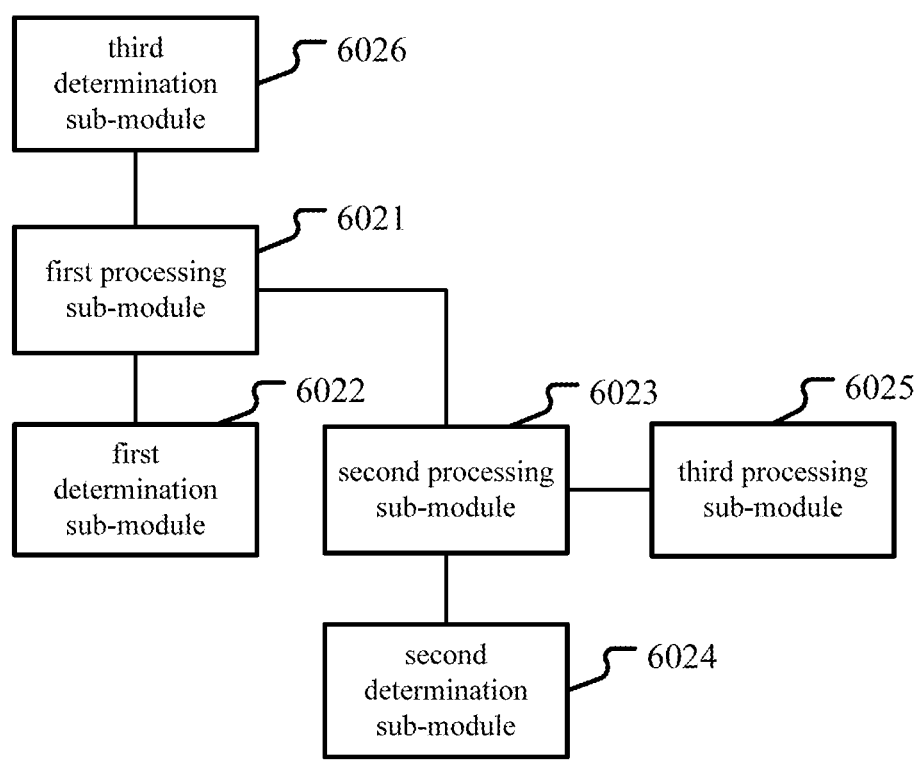
FIG. 10 is a block diagram for a further example of apparatus for device control according to the present disclosure.

In another aspect of the present disclosure, as shown in FIG. 10, the determination module 602 may further include a third determination sub-module 6026 configured to determine that the remaining battery energy is insufficient to enable the device to operate with the operating power for the timing period, when a period of time resulted from the remaining battery energy divided by the operating power is less than the timing period.

The present disclosure further provides an apparatus for device control. The apparatus may include: a processor; and a memory, used to store processor-executable instructions; where the processor may be configured to: obtain remaining battery energy, an operating power and a timing period of the device; determine a power change curve of the device based on the remaining battery energy, the operating power and the timing period, when the remaining battery energy is insufficient to enable the device to operate with the operating power for the timing period; and adjust an operating power of the device according to the power change curve of the device to enable the device to operate for the timing period.

Figure 11:
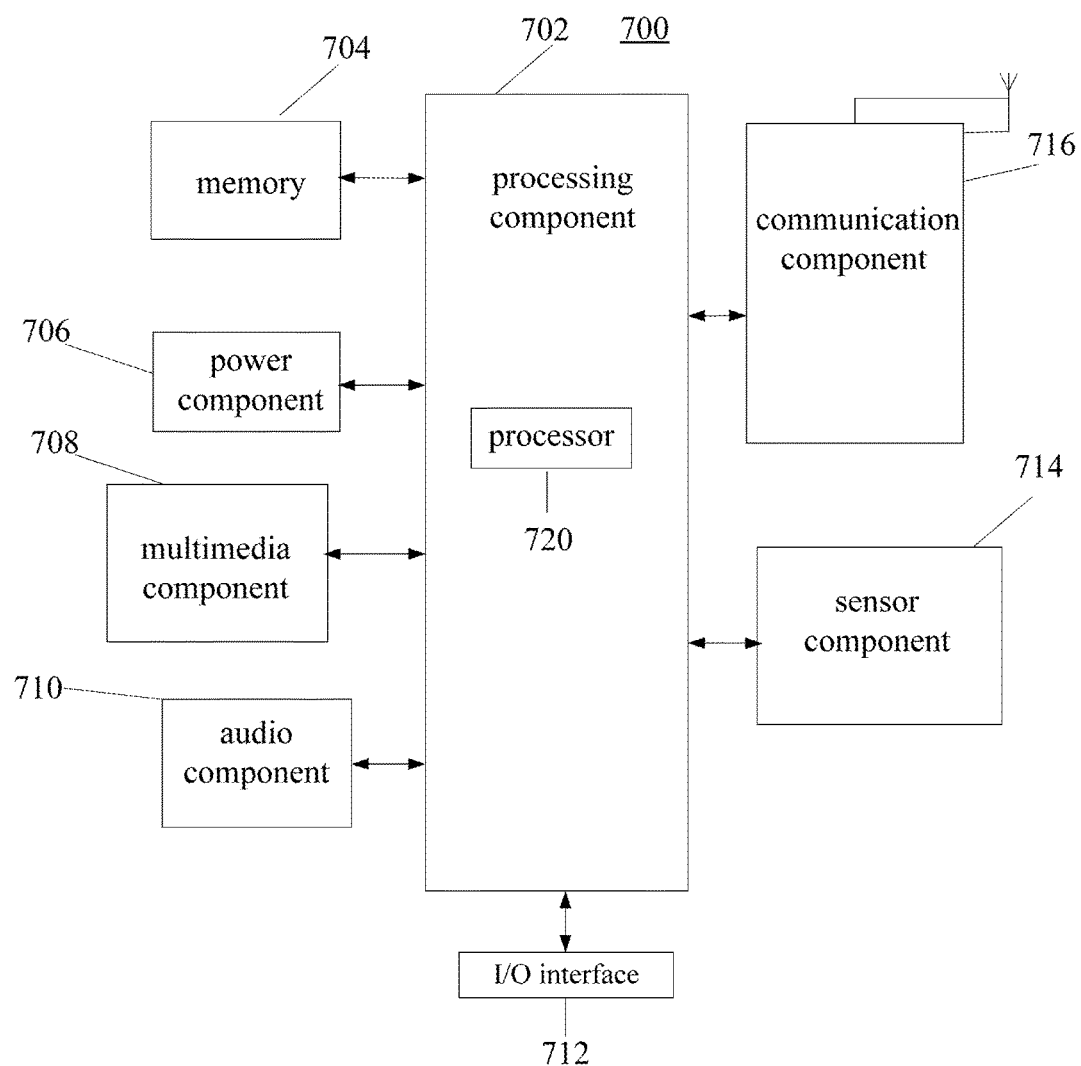
FIG. 11 shows an example of an apparatus for device control according to the present disclosure.

FIG. 11 is a block diagram illustrating an apparatus 700 for device control according to the present disclosure. For example, the apparatus 700 may be a mobile phone, a computer, a digital broadcast terminal, a messaging device, a gaming console, a tablet, a medical device, a piece of exercise equipment, a personal digital assistant, a washing machine, a fan, a light and the like.

Referring to FIG. 11, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules that facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power for the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the apparatus 700 is in an operation mode, such as a photographing mode or a video mode. Each of the front camera and the rear camera may be a fixed optical lens system or have optical focusing and zooming capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, the peripheral interface modules being, for example, a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may detect an open/closed status of the apparatus 700, relative positioning of components (e.g., the display and the keypad, of the apparatus 700), a switch in position of the apparatus 700 or a component of the apparatus 700, a presence or absence of user contact with the apparatus 700, an orientation or an acceleration/deceleration of the apparatus 700, and a switch in temperature of the apparatus 700. The sensor component 714 may include a proximity sensor configured to detect the presence of a nearby object without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 can access a wireless network based on a communication standard, such as WiFi, 2G, or 3G, or a combination thereof. In an exemplary embodiment, the communication component 716 receives a broadcast signal or broadcast associated information from an external broadcast management system via a broadcast channel. In an exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 704, executable by the processor 720 in the apparatus 700, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium having stored thereon instructions that, when executed by a processor of a terminal device, cause the terminal device to perform: obtaining remaining battery energy, an operating power and a timing period of the device; determining a power change curve of the device based on the remaining battery energy, the operating power and the timing period, when the remaining battery energy is insufficient to enable the device to operate with the operating power for the timing period; and adjusting an operating power of the device according to the power change curve of the device to enable the device to operate for the timing period.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other embodiments of the disclosure will be apparent to those skilled in the art from consideration of the specification and practice of the disclosures herein. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated in the following claims.

It will be appreciated that the inventive concept is not limited to the exact construction that has been described above and illustrated in the accompanying drawings, and that various modifications and variations can be made without departing from the scope thereof. It is intended that the scope of the disclosure only be limited by the appended claims.

What is claimed is:

1. A method for device control, comprising:
obtaining remaining battery energy, an operating power and a timing period for the device; determining a power change curve of the device based on the remaining battery energy, the operating power and the timing period when the remaining battery energy is insufficient to enable the device to operate with the operating power for the timing period; and
adjusting the operating power of the device according to the power change curve of the device to enable the device to operate for the timing period, wherein
the determining of the power change curve of the device based on the remaining battery energy, the operating power and the timing period comprises:
partitioning the timing period into a plurality of predetermined time intervals, at a start of each of the predetermined time intervals, reducing the operating power of the device by a predetermined value, wherein the predetermined value is determined by determining a difference between the operating power and a minimum operating power of the device and evenly partitioning the difference by a number of the predetermined time intervals;
adjusting the predetermined value comprises:
partitioning the difference evenly by the number of predetermined time intervals, among the predetermined time intervals, during which the device is not operating with the minimum operating power of the device to redetermine the predetermined value.

2. The method of claim 1, wherein the determining the power change curve of the device based on the remaining battery energy, the operating power and the timing period comprises:
partitioning the timing period evenly into the plurality of predetermined time intervals, at the start of each of the predetermined time intervals, reducing the operating power of the device by the predetermined value, and generating a first power change curve based on an operating power value within each of the predetermined time intervals; and
determining the first power change curve as the power change curve of the device when the energy required for operating for the timing period, which is calculated according to the first power change curve, is equal to or less than the remaining battery energy.

3. The method of claim 2, wherein the determining the power change curve of the device further comprises:
adjusting the predetermined value to increase, among the predetermined time intervals, the number of predetermined time intervals during which the device is operating with the minimum operating power of the device, and generating a second power change curve based on the operating power value within each of the predetermined time intervals when the energy required for operating for the timing period, which is calculated according to the first power change curve, is greater than the remaining battery energy; and
determining the second power change curve as the power change curve of the device when the energy required for operating for the timing period, which is calculated according to the second power change curve, is equal to or less than the remaining battery energy.

4. The method of claim 3, wherein determining the power change curve of the device further comprises:
when the energy required for operating for the timing period, which is calculated according to the second power change curve, is greater than the remaining battery energy, repeatedly adjusting the predetermined value to gradually increase, among the predetermined time intervals, the number of predetermined time intervals during which the device is operating with the minimum operating power of the device, and then regenerating the second power change curve based on the operating power value within each of the predetermined time intervals until energy required for operating for the timing period, which is calculated according to the regenerated second power change curve, is equal to or less than the remaining battery energy; and
determining the regenerated second power change curve as the power change curve of the device.

5. The method of claim 1, wherein, when the remaining battery energy is insufficient to enable the device to operate with the operating power for the timing period, the method comprises:
determining that the remaining battery energy is insufficient to enable the device to operate with the operating power for the timing period when a period of time resulted from the remaining battery energy divided by the operating power is less than the timing period.

6. An apparatus for device control, comprising:
a processor; and
a memory used to store processor-executable instructions to be executable by the processor;
wherein the processor is configured to:
obtain remaining battery energy, an operating power and a timing period for the device;
determine a power change curve of the device based on the remaining battery energy, the operating power and the timing period when the remaining battery energy is insufficient to enable the device to operate with the operating power for the timing period; and
adjust the operating power of the device according to the power change curve of the device to enable the device to operate for the timing period, wherein
the determining of the power change curve of the device based on the remaining battery energy, the operating power and the timing period comprises:
partition the timing period into a plurality of predetermined time intervals, at a start of each of the predetermined time intervals, reduce the operating power of the device by a predetermined value;
determine the predetermined value by determining a difference between the operating power and a minimum operating power of the device and evenly partition the difference by a number of the predetermined time intervals; and
adjust the predetermined value comprises:
partition the difference evenly by the number of predetermined time intervals, among the predetermined time intervals, during which the device is not operating with a minimum operating power of the device to redetermine the predetermined value.

7. The apparatus of claim 6, wherein the processor is further configured to:
partition the timing period evenly into the plurality of predetermined time intervals, at the start of each of the predetermined time intervals, reduce the operating power of the device by the predetermined value, and generate a first power change curve based on an operating power value within each of the predetermined time intervals; and
determine the first power change curve as the power change curve of the device when the energy required for operating for the timing period, which is calculated according to the first power change curve, is equal to or less than the remaining battery energy.

8. The apparatus of claim 7, wherein the processor is further configured to:
adjust the predetermined value to increase, among the predetermined time intervals, the number of predetermined time intervals during which the device is operating with the minimum operating power of the device, and generate a second power change curve based on the operating power value within each of the predetermined time intervals when the energy required for operating for the timing period, which is calculated according to the first power change curve, is greater than the remaining battery energy; and
determine the second power change curve as the power change curve of the device when the energy required for operating for the timing period, which is calculated according to the second power change curve, is equal to or less than the remaining battery energy.

9. The apparatus of claim 8, wherein the processor is further configured to:
when the energy required for operating for the timing period, which is calculated according to the second power change curve, is greater than the remaining battery energy, repeatedly adjust the predetermined value to gradually increase, among the predetermined time intervals, the number of predetermined time intervals during which the device is operating with the minimum operating power of the device, and then regenerate the second power change curve based on the operating power value within each of the predetermined time intervals until the energy required for operating for the timing period, which is calculated according to the regenerated second power change curve, is equal to or less than the remaining battery energy; and
determine the regenerated second power change curve as the power change curve of the device.

10. The apparatus of claim 6, wherein the processor is further configured to determine that the remaining battery energy is insufficient to enable the device to operate with the operating power for the timing period when a period of time resulted from the remaining battery energy divided by the operating power is less than the timing period.

11. A non-transitory computer-readable storage medium having stored therein instructions that, when executed by a processor, cause the processor to perform:
obtaining remaining battery energy, an operating power and a timing period for a device;
determining a power change curve of the device based on the remaining battery energy, the operating power and the timing period when the remaining battery energy is insufficient to enable the device to operate with the operating power for the timing period; and
adjusting the operating power of the device according to the power change curve of the device to enable the device to operate for the timing period, wherein
the determining of the power change curve of the device based on the remaining battery energy, the operating power and the timing period comprises:

partitioning the timing period into a plurality of predetermined time intervals, at a start of each of the predetermined time intervals, reducing the operating power of the device by a predetermined value, wherein the predetermined value is determined by determining a difference between the operating power and a minimum operating power of the device and evenly partitioning the difference by a number of the predetermined time intervals;

adjusting the predetermined value comprises:

partitioning the difference evenly by the number of predetermined time intervals, among the predetermined time intervals, during which the device is not operating with a minimum operating power of the device to redetermine the predetermined value.

\* \* \* \* \*